(12) United States Patent
McAndrews

(10) Patent No.: US 9,580,134 B2
(45) Date of Patent: Feb. 28, 2017

(54) BICYCLE DAMPING ENHANCEMENT SYSTEM

(71) Applicant: SPECIALIZED BICYCLE COMPONENTS, INC., Morgan Hill, CA (US)

(72) Inventor: Michael McAndrews, Capitola, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 14/657,329

(22) Filed: Mar. 13, 2015

(65) Prior Publication Data

US 2015/0353162 A1 Dec. 10, 2015

Related U.S. Application Data

(63) Continuation of application No. 13/900,384, filed on May 22, 2013, now Pat. No. 8,978,846, which is a
(Continued)

(51) Int. Cl.
*B62K 25/28* (2006.01)
*B62K 25/04* (2006.01)
(Continued)

(52) U.S. Cl.
CPC .......... *B62K 25/04* (2013.01); *B62K 3/02* (2013.01); *B62K 25/10* (2013.01); *B62K 25/286* (2013.01);
(Continued)

(58) Field of Classification Search
CPC ...... B62K 25/286; B62K 25/10; B62K 25/20; F16F 9/504; F16F 9/096
(Continued)

(56) References Cited

U.S. PATENT DOCUMENTS 1,492,328 A 4/1924 Lang
2,311,993 A 2/1943 Olsen
(Continued)

FOREIGN PATENT DOCUMENTS

DE 41 23 643 A1 6/1992
FR 1 125 267 10/1956
(Continued)

OTHER PUBLICATIONS

Office Action dated Aug. 5, 2008; U.S. Appl. No. 11/771,917, filed Jun. 29, 2007.
(Continued)

*Primary Examiner* — Thomas Irvin
(74) *Attorney, Agent, or Firm* — Knobbe Martens Olson & Bear LLP

(57) ABSTRACT

A bicycle shock absorber and methods for differentiating between rider-induced forces and terrain-induced forces includes a first fluid chamber having fluid contained therein, a piston for compressing the fluid within the fluid chamber, a second fluid chamber coupled to the first fluid chamber by a fluid communication hose, and an inertial valve disposed within the second fluid chamber. The inertial valve opens in response to terrain-induced forces and provides communication of fluid compressed by the piston from the first fluid chamber to the second fluid chamber. The inertial valve does not open in response to rider-induced forces.

19 Claims, 11 Drawing Sheets

Related U.S. Application Data continuation of application No. 13/714,191, filed on Dec. 13, 2012, now Pat. No. 8,453,808, which is a continuation of application No. 13/328,281, filed on Dec. 16, 2011, now Pat. No. 8,333,268, which is a continuation of application No. 11/771,946, filed on Jun. 29, 2007, now abandoned, which is a continuation of application No. 11/417,554, filed on May 3, 2006, now Pat. No. 7,270,221, which is a continuation of application No. 11/301,456, filed on Dec. 13, 2005, now Pat. No. 7,299,906, which is a continuation of application No. 10/811,784, filed on Mar. 29, 2004, now Pat. No. 6,991,076, which is a continuation of application No. 09/919,582, filed on Jul. 31, 2001, now Pat. No. 6,722,678, which is a continuation of application No. 09/288,003, filed on Apr. 6, 1999, now Pat. No. 6,267,400.

(51) Int. Cl.
    *F16F 9/096*     (2006.01)
    *F16F 9/504*     (2006.01)
    *B62K 25/10*     (2006.01)
    *B62K 3/02*     (2006.01)
    *B62K 25/20*     (2006.01)

(52) U.S. Cl.
    CPC .............. *F16F 9/096* (2013.01); *F16F 9/504* (2013.01); *B62K 25/20* (2013.01); *B62K 2025/048* (2013.01)

(58) Field of Classification Search
    USPC .......... 188/266.2, 275, 282.8, 297, 302–305, 188/313–315
    See application file for complete search history.

(56) References Cited

U.S. PATENT DOCUMENTS

| | | | |
|---|---|---|---|
| 3,062,330 A | 11/1962 | Lyon, Jr. |
| 3,127,958 A | 4/1964 | Szostak |
| 3,696,894 A | 10/1972 | Brady et al. |
| 4,082,169 A | 4/1978 | Bowles |
| 4,126,302 A | 11/1978 | Curnutt |
| 4,127,038 A | 11/1978 | Browning |
| 4,153,237 A | 5/1979 | Supalla |
| 4,210,344 A | 7/1980 | Curnutt |
| 4,492,290 A | 1/1985 | Zavodny |
| 4,572,317 A | 2/1986 | Isono et al. |
| 4,580,997 A | 4/1986 | Browning et al. |
| 4,592,738 A | 6/1986 | Nagano |
| 4,616,810 A | 10/1986 | Richardson et al. |
| 4,679,811 A | 7/1987 | Shuler |
| 4,732,244 A | 3/1988 | Verkuylen |
| 4,790,554 A | 12/1988 | Siegwart, Jr. |
| 4,807,860 A | 2/1989 | Simons |
| 4,872,537 A | 10/1989 | Warner |
| 4,917,222 A | 4/1990 | Bacardit |
| 4,928,799 A | 5/1990 | Zschiesche |
| 4,958,706 A | 9/1990 | Richardson |
| 5,000,470 A | 3/1991 | Kamler et al. |
| 5,080,392 A | 1/1992 | Bazergui |
| 5,285,875 A | 2/1994 | Munoz |
| 5,332,068 A | 7/1994 | Richardson et al. |
| 5,337,864 A | 8/1994 | Sjöström |
| 5,458,218 A | 10/1995 | Runkel |
| 5,462,140 A | 10/1995 | Cazort et al. |
| 5,509,675 A | 4/1996 | Barnett |
| 5,509,679 A | 4/1996 | Leitner |
| 5,598,903 A | 2/1997 | Richardson |
| 5,634,653 A | 6/1997 | Browning |
| 5,678,837 A | 10/1997 | Leitner |
| 5,791,674 A | 8/1998 | D'Aluisio et al. |
| 5,810,128 A | 9/1998 | Eriksson et al. |
| 5,823,305 A | 10/1998 | Richardson et al. |
| 5,829,773 A | 11/1998 | Rajaee |
| 5,848,675 A | 12/1998 | Gonzalez |
| 5,921,572 A | 7/1999 | Bard et al. |
| 5,954,167 A | 9/1999 | Richardson et al. |
| 5,957,252 A | 9/1999 | Berthold |
| 5,971,116 A | 10/1999 | Franklin |
| 5,996,746 A | 12/1999 | Turner et al. |
| 6,026,939 A | 2/2000 | Girvin et al. |
| 6,105,987 A | 8/2000 | Turner |
| 6,119,830 A | 9/2000 | Richardson et al. |
| 6,142,268 A | 11/2000 | Kuo-An |
| 6,164,424 A | 12/2000 | Girvin et al. |
| 6,213,263 B1 | 4/2001 | De Frenne |
| 6,253,889 B1 | 7/2001 | Shirley et al. |
| 6,254,067 B1 | 7/2001 | Yih |
| 6,267,400 B1 | 7/2001 | McAndrews |
| 6,286,642 B1 | 9/2001 | Yi |
| 6,311,961 B1 | 11/2001 | Julia |
| 6,334,516 B1 | 1/2002 | Shirley et al. |
| 6,360,857 B1 | 3/2002 | Fox et al. |
| 6,581,948 B2 | 6/2003 | Fox |
| 6,604,751 B2 | 8/2003 | Fox |
| 6,722,678 B2 | 4/2004 | McAndrews |
| 6,991,076 B2 | 1/2006 | McAndrews |
| 7,124,865 B2 | 10/2006 | Turner et al. |
| 7,128,192 B2 | 10/2006 | Fox |
| 7,261,194 B2 | 8/2007 | Fox |
| 7,270,221 B2 | 9/2007 | McAndrews |
| 7,273,137 B2 | 9/2007 | Fox |
| 7,299,906 B2 | 11/2007 | McAndrews |
| 7,448,638 B2 | 11/2008 | Fox |
| 7,484,603 B2 | 2/2009 | Fox |
| 7,490,705 B2 | 2/2009 | Fox |
| 7,497,308 B2 | 3/2009 | McAndrews |
| 7,506,884 B2 | 3/2009 | Fox |
| 7,520,372 B2 | 4/2009 | Fox |
| 7,556,130 B2 | 7/2009 | Lamoureux et al. |
| 7,568,563 B2 | 8/2009 | McAndrews |
| 7,641,028 B2 | 1/2010 | Fox |
| 7,673,726 B2 | 3/2010 | McAndrews |
| 7,690,667 B2 | 4/2010 | McAndrews |
| 7,694,987 B2 | 4/2010 | McAndrews |
| 7,748,506 B2 | 7/2010 | McAndrews |
| 7,766,135 B2 | 8/2010 | Fox |
| 8,297,417 B2 | 10/2012 | Fox |
| 8,333,268 B2 | 12/2012 | McAndrews |
| 2007/0119670 A1 | 5/2007 | Fox |
| 2007/0227845 A1 | 10/2007 | Fox |
| 2008/0053768 A1 | 3/2008 | Fox |

FOREIGN PATENT DOCUMENTS

| | | |
|---|---|---|
| JP | 5 910 67 34 | 6/1984 |
| WO | WO 98/03361 | 1/1998 |
| WO | WO 99/31403 | 6/1999 |

OTHER PUBLICATIONS

Amendment filed Sep. 23, 2008; U.S. Appl. No. 11/771,917, filed Jun. 29, 2007.
Final Office Action dated Jan. 9, 2009; U.S. Appl. No. 11/771,917, filed Jun. 29, 2007.
European Patent Office, European Search Report, Application No. EP 03 01 5960, dated Nov. 15, 2004.
Case No. CV05 0486 DDP PJWx; U.S. District Court, Complaint for Patent Infringement of U.S. Pat. No. 6,722,678; Jan. 20, 2005.
Case No. CV05 0486 DDP PJWx; U.S. District Court, Defendant Onsport, LLC's Notice of Motion and Motion for Sactions Under Rule 11 Fed. R. Civ. P.; Apr. 18, 2005.
English Translation of French Patent No. 1125267 to Gatter, dated Oct. 1956, cited in Office Action mailed Jun. 6, 2005.
U.S. District Court, Central District of California, Order Denying Motion for Sanctions, Jun. 8, 2005.
U.S. District Court, Central District of California, Plaintiff Specialized Bicycle Components Inc.'s Opening Claim Construction Brief, Jul. 15, 2005.

(56) References Cited

OTHER PUBLICATIONS

U.S. District Court, Central District of California, Onsport, LLC's Opening Claim Construction Memorandum, Jul. 29, 2005.
U.S. District Court, Central District of California, Plaintiff Specialized Bicycle Components Inc.'s Responses to Onsport LLC's First Set of Requests for Admission (Nos. 1-128), Aug. 10, 2005.
U.S. District Court, Central District of California, Plaintiff Specialized Bicycle Components Inc.'s Reply Brief in Support of Claim Construction Brief, Aug. 12, 2005.
Edelbrock Performance Products, www.edelbrock.com, archived Jul. 20, 1997, printed Sep. 11, 2007, pp. 1 & 2.
Edelbrock Performer IAS Shocks With Patented Inertia Active System, www.coolwheels.net/edelbroc.htm, archived Jul. 20, 1997, printed Sep. 11, 2007, p. 1.

BICYCLE DAMPING ENHANCEMENT SYSTEM

RELATED APPLICATIONS

Related applications are identified in an application data sheet (ADS) filed with this application.

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND OF THE INVENTION

Field of the Invention

This invention relates generally to the field of bicycle suspensions. More particularly, the invention relates to a damping enhancement system for a bicycle.

Description of the Related Art

For many years bicycles were constructed using exclusively rigid frame designs. These conventional bicycles relied on air-pressurized tires and a small amount of natural flexibility in the frame and front forks to absorb the bumps of the road and trail. This level of shock absorption was generally considered acceptable for bicycles which were ridden primarily on flat, well maintained roads. However, as "off-road" biking became more popular with the advent of All Terrain Bicycles ("ATBs"), improved shock absorption systems were needed to improve the smoothness of the ride over harsh terrain. As a result, new shock absorbing bicycle suspensions were developed.

Two such suspension systems are illustrated in FIGS. 1 and 2. These two rear suspension designs are described in detail in Leitner, U.S. Pat. No. 5,678,837, and Leitner, U.S. Pat. No. 5,509,679, which are assigned to the assignee of the present application. Briefly, FIG. 1 illustrates a telescoping shock absorber 110 rigidly attached to the upper arm members 103 of the bicycle on one end and pivotally attached to the bicycle seat tube 120 at the other end (point 106). FIG. 2 employs another embodiment wherein a lever 205 is pivotally attached to the upper arm members 203 and the shock absorber 210 is pivotally attached to the lever 205 at an intermediate position 204 between the ends of the lever 205.

There are several problems associated with the conventional shock absorbers employed in the foregoing rear suspension systems. One problem is that conventional shock absorbers are configured with a fixed damping rate. As such, the shock absorber can either be set "soft" for better wheel compliance to the terrain or "stiff" to minimize movement during aggressive pedaling of the rider. However, there is no mechanism in the prior art which provides for automatic adjustment of the shock absorber setting based on different terrain and/or pedaling conditions.

A second, related problem with the prior art is that conventional shock absorbers are only capable of reacting to the relative movement between the bicycle chassis and the wheel. In other words, the shock absorber itself has no way of differentiating between forces caused by the upward movement of the wheel (i.e., due to contact with the terrain) and forces caused by the downward movement of the chassis (i.e., due to movement of the rider's mass).

Thus, most shock absorbers are configured somewhere in between the "soft" and "stiff" settings (i.e., at an intermediate setting). Using a static, intermediate setting in this manner means that the "ideal" damper setting—i.e., the perfect level of stiffness for a given set of conditions—will never be fully realized. For example, a rider, when pedaling hard for maximum power and efficiency, prefers a rigid suspension whereby human energy output is vectored directly to the rotation of the rear wheel. By contrast, a rider prefers a softer suspension when riding over harsh terrain. A softer suspension setting improves the compliance of the wheel to the terrain which, in turn, improves the control by the rider.

Accordingly, what is needed is a damping system which will dynamically adjust to changes in terrain and/or pedaling conditions. What is also needed is a damping system which will provide to a "stiff" damping rate to control rider-induced suspension movement and a "soft" damping rate to absorb forces from the terrain. Finally, what is needed is a damping system which will differentiate between upward forces produced by the contact of the wheel with the terrain and downward forces produced by the movement of the rider's mass.

SUMMARY OF THE INVENTION

An embodiment involves a bicycle having a bicycle frame and a pedal crank assembly supported by the bicycle frame and configured to be driven by rider-induced pedaling forces. The bicycle also includes a wheel and a suspension assembly interposed between the bicycle frame and the wheel. The suspension assembly includes a spring that applies a force tending to extend the suspension assembly. A damper includes a damper tube and a piston rod supporting a piston in sliding engagement with the damper tube. The piston and the damper tube at least partially define a compression chamber that decreases in volume during compression movement of the suspension assembly. The damper additionally includes an inertia valve having an inertia mass that is normally biased to a closed position in which the inertia mass is adjacent an opening to the compression chamber such that fluid flow through the opening is inhibited. The inertia mass is movable to an open position in which the inertia mass is not adjacent the opening such that fluid flow through the opening is not inhibited. The inertia valve remains in the closed position in response to the rider-induced pedaling forces applied to the frame and the inertia valve moves toward the open position in response to a terrain-induced force above a predetermined threshold applied to the wheel. A sensitivity adjuster has a first adjustment position and a second adjustment position. The inertia valve has a first sensitivity in the first adjustment position and the inertia valve has a second sensitivity in the second adjustment position, wherein the second sensitivity is different from the first sensitivity.

An embodiment involves a method of providing for adjustment of a bicycle shock absorber, including providing a bicycle shock absorber comprising a spring that applies a force tending to extend the suspension assembly, a damper tube, a piston supported on a piston rod and in sliding engagement with the damper tube. The piston and the damper tube at least partially define a compression chamber that decreases in volume during compression movement of the suspension assembly. The damper also includes an inertia valve including an inertia mass that is normally biased to a closed position wherein the inertia mass is adjacent an opening to the compression chamber such that fluid flow through the opening is inhibited and is movable to an open position wherein the inertia mass is not adjacent the opening such that fluid flow through the opening is not inhibited. The inertia valve remains in the closed position in response to the rider-induced pedaling forces applied to the frame and the inertia valve moves toward the open position in response to a terrain-induced force above a predetermined threshold applied to the wheel. A sensitivity adjuster is provided for the inertia valve. A first adjustment position of the sensitivity adjuster is provided in which the inertia valve has a first sensitivity to terrain-induced forces. A second adjustment position of the sensitivity adjuster is provided in which the inertia valve has a second sensitivity to terrain-induced forces that is different from the first sensitivity. The sensitivity adjuster is allowed to be set to either of the first adjustment position or the second adjustment position.

An embodiment involves a method of operating a bicycle shock absorber, which includes operating a bicycle shock absorber with a sensitivity adjuster positioned in a first adjustment position. The bicycle shock absorber includes a spring that applies a force tending to extend the suspension assembly. The shock absorber also includes a damper tube and a piston supported on a piston rod and in sliding engagement with the damper tube. The piston and the damper tube at least partially define a compression chamber that decreases in volume during compression movement of the suspension assembly. The damper also includes an inertia valve including an inertia mass. The inertia mass is normally biased to a closed position wherein the inertia mass is adjacent an opening to the compression chamber such that fluid flow through the opening is inhibited and is movable to an open position wherein the inertia mass is not adjacent the opening such that fluid flow through the opening is not inhibited. The inertia valve remains in the closed position in response to the rider-induced pedaling forces applied to the frame and moves toward the open position in response to a terrain-induced force above a predetermined threshold applied to the wheel. The inertia valve has a first sensitivity to terrain-induced forces in the first adjustment position of the sensitivity adjuster. The sensitivity adjuster is adjusted to a second adjustment position in which the inertia valve has a second sensitivity to terrain-induced forces that is different from the first sensitivity. The bicycle shock absorber is operated with the sensitivity adjuster in the second adjustment position.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENTS

Figure 3:
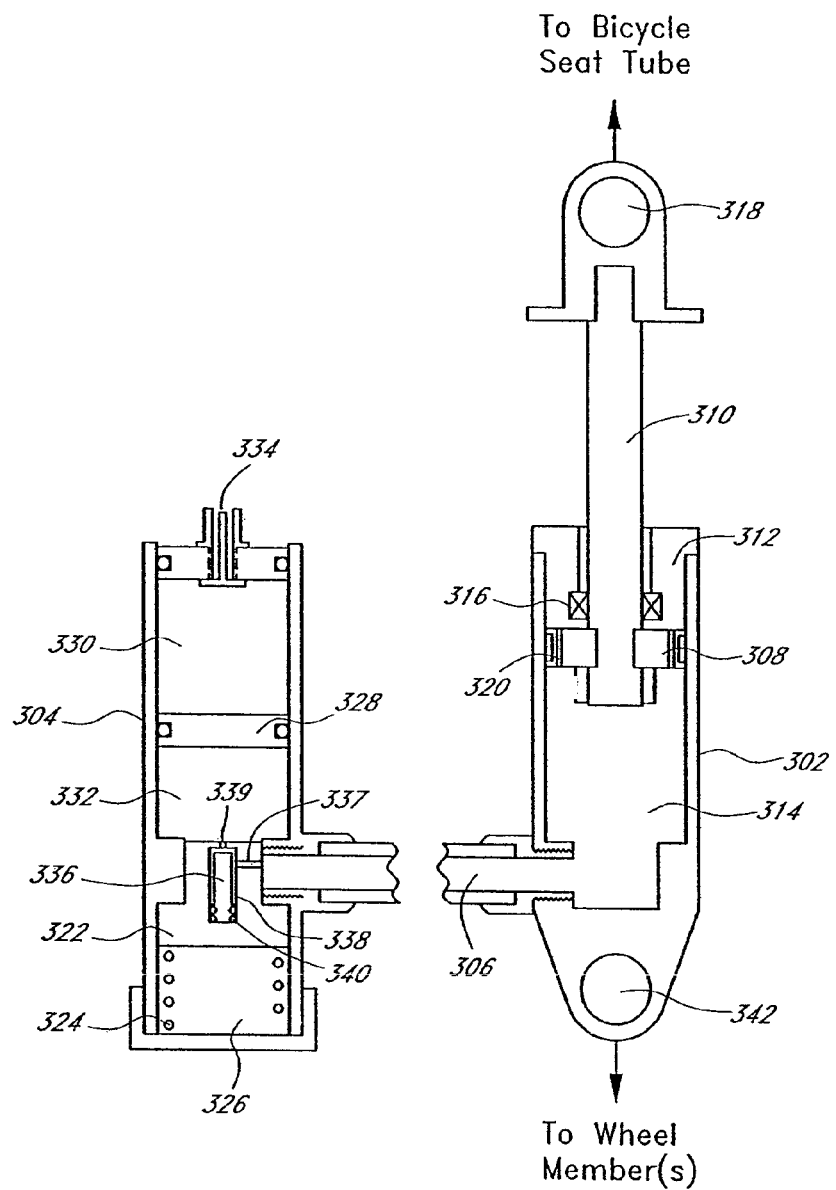
FIG. 3 illustrates one embodiment of the present invention.

A damping enhancement system is described which differentiates between upward forces produced by the contact of the bicycle wheel with the terrain and downward forces produced by the movement of the rider's mass. In the following description, for the purposes of explanation, numerous specific details are set forth in order to provide a thorough understanding of the present invention. It will be apparent, however, to one of ordinary skill in the art that the present invention may be practiced without some of these specific details. In other instances, certain well-known structures are illustrated and described in limited detail to avoid obscuring the underlying principles of the present invention.
An Embodiment of the Damper Enhancement System One embodiment of the present damper enhancement system is illustrated in FIG. 3. The apparatus is comprised generally of a primary tube 302 and a remote tube 304 coupled via a connector hose 306.

Figure 1:
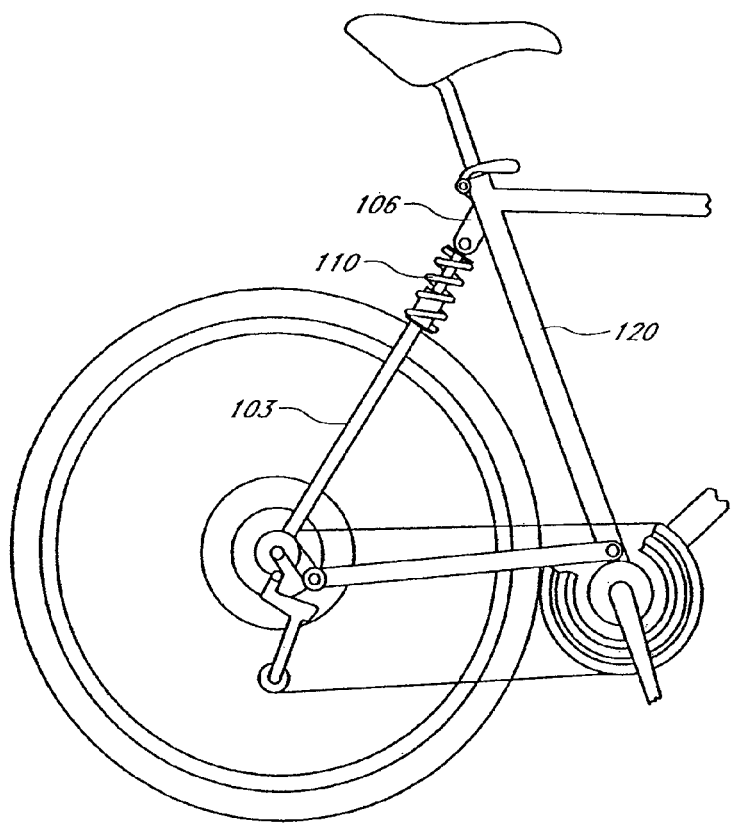
FIG. 1 illustrates a prior art rear suspension configuration for a bicycle.
Figure 2:
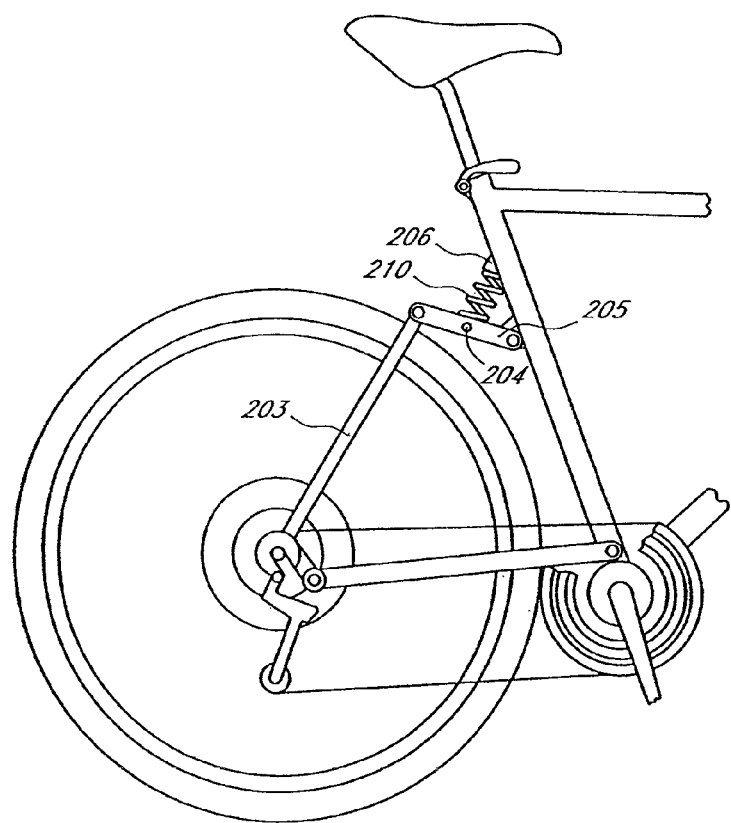
FIG. 2 illustrates a prior art rear suspension configuration for a bicycle.

The damper enhancement system described hereinafter may be coupled to a bicycle in the same manner as contemporary shock absorbers (i.e., such as those illustrated in FIGS. 1 and 2). For example, the damper enhancement system may be coupled to a bicycle as illustrated in FIG. 1 wherein the upper mount 318 is pivotally coupled to the seat tube at point 106 and the lower mount 342 is fixedly coupled to the upper arm member 103. Moreover, the damper enhancement system may be coupled to a bicycle as illustrated in FIG. 2 wherein the upper mount 318 is pivotally coupled to the seat tube at a point 206 and the lower mount 342 is fixedly coupled to a point 204 on lever 211. These two constructions are illustrated in FIGS. 8-9 and FIGS. 10-11, respectively.

Figure 8:
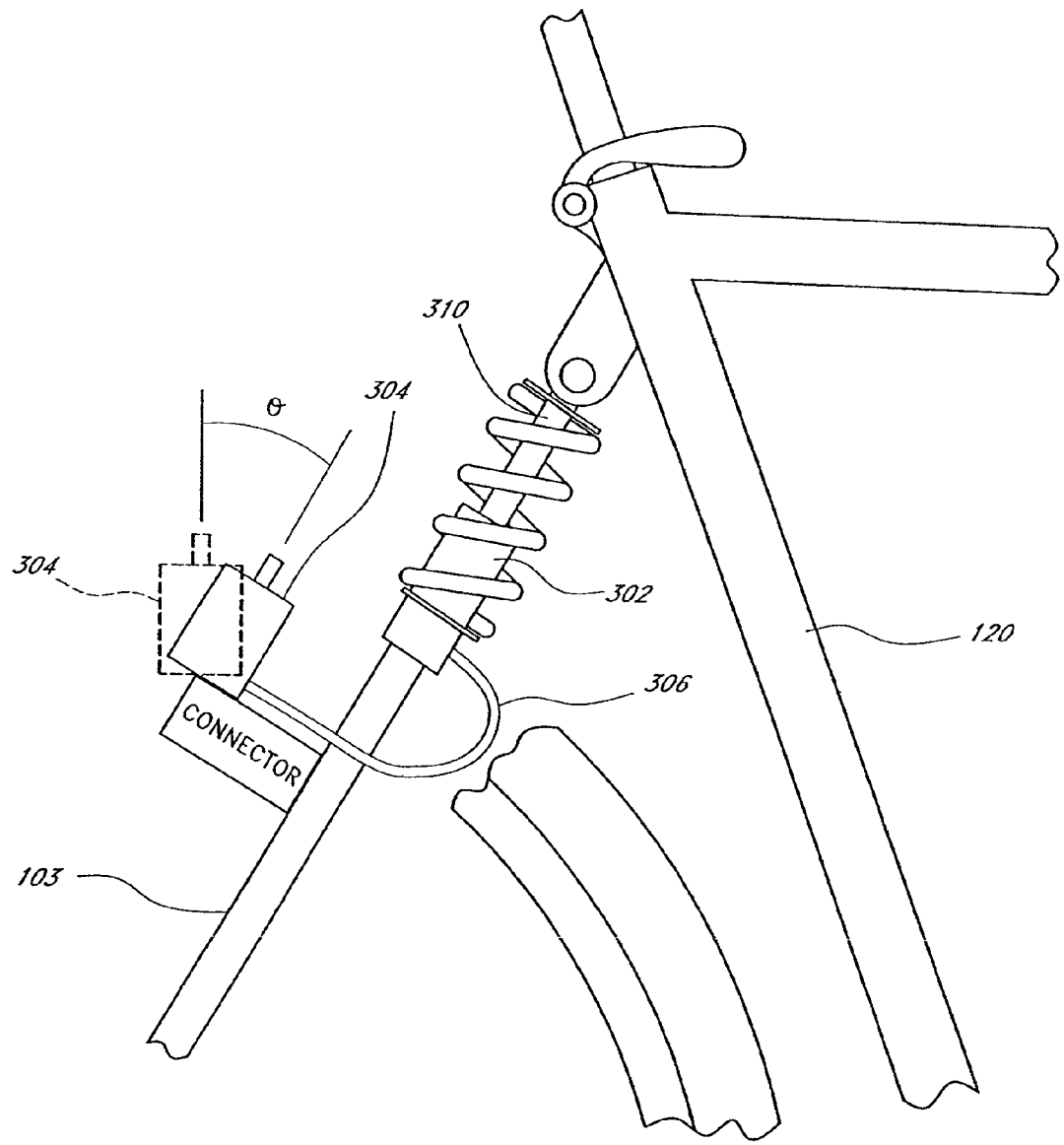
FIG. 8 is an enlarged schematic view of an embodiment of the present invention wherein the primary tube is mounted directly to an upper arm member and the remote tube is connected to an upper arm member of a bicycle. An angled position of the remote tube is shown in phantom.
Figure 9:
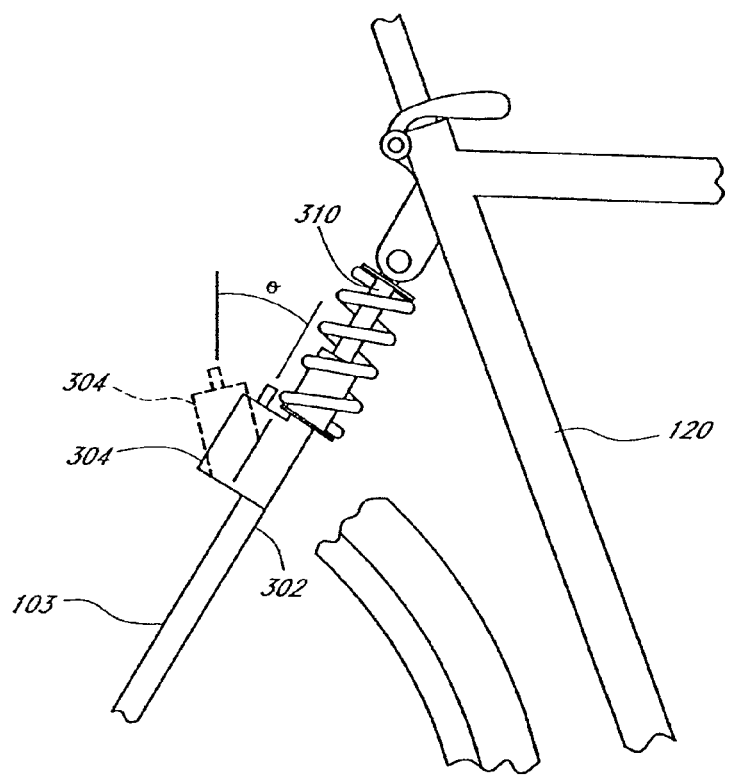
FIG. 9 is an enlarged schematic view of an embodiment of the present invention wherein the primary tube is mounted directly to an upper arm member and the remote tube and the primary tube are a single unit. An angled position of the remote tube is shown in phantom.
Figure 10:
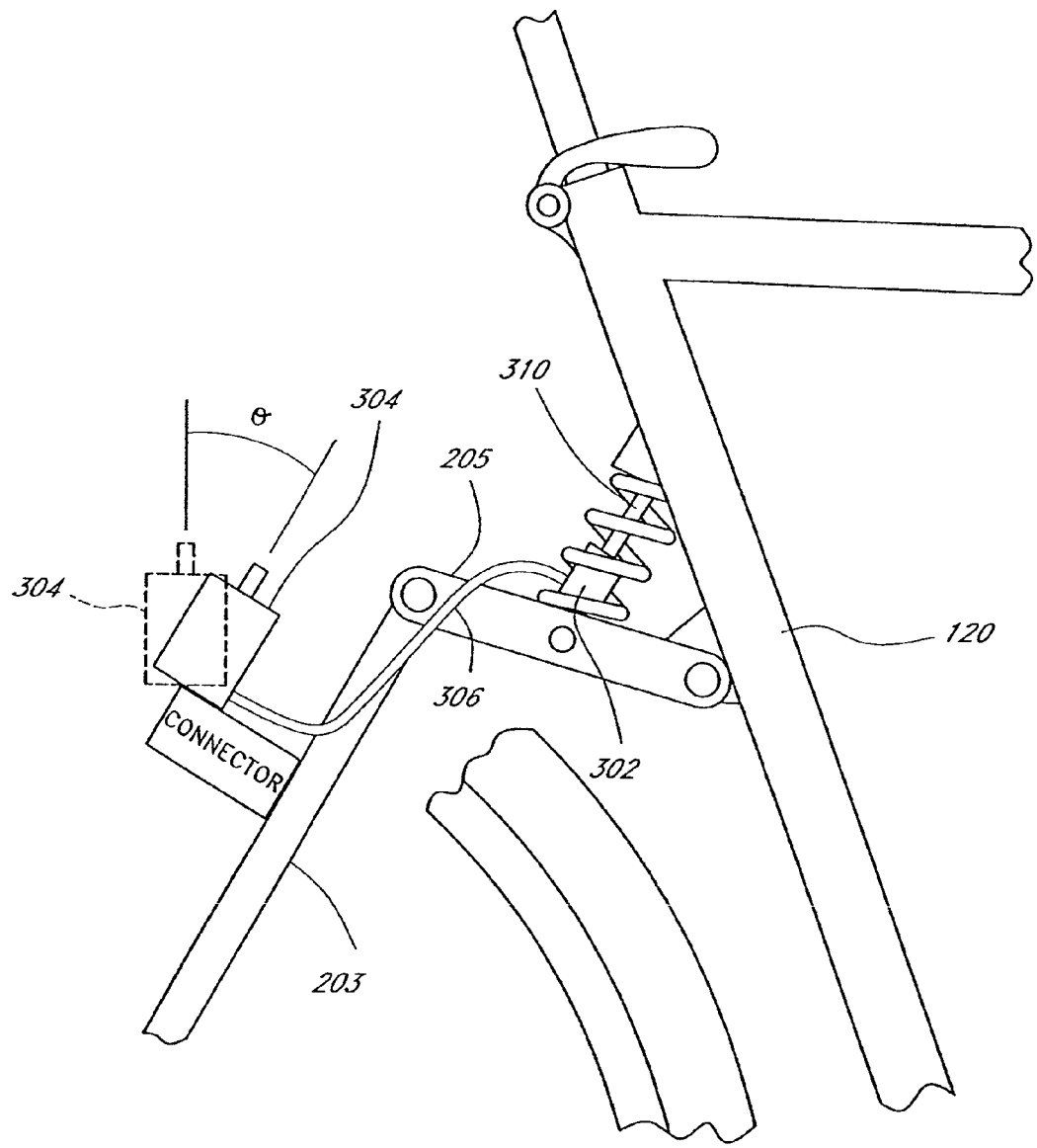
FIG. 10 is an enlarged schematic view of embodiment of the present invention wherein the primary tube is mounted to a lever and the remote tube is connected to an upper arm member of a bicycle. An angled position of the remote tube is shown in phantom.
Figure 11:
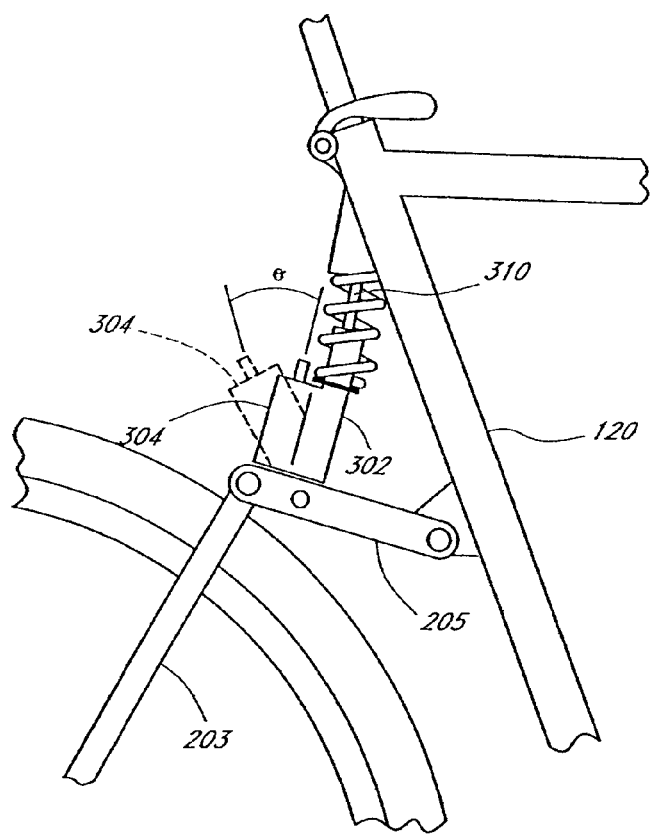
FIG. 11 is an enlarged schematic view of an embodiment of the present invention wherein the primary tube is mounted to a lever and the remote tube and the primary tube are a single unit. An angled position of the remote tube is shown in phantom.

In addition, depending on the particular embodiment of the damper enhancement system, the connector hose may be of varying lengths and made from varying types of material. For example, the connector hose 306 may be short and comprised of metal. In this case, the primary tube 302 and the remote tube 304 will be closely coupled together—possibly in a single unit. Such a construction is illustrated in FIG. 9 and FIG. 11. By contrast, the connector hose may be long and comprised of a flexible material. In this case, the remote tube 304 may be separated from the primary tube 302 and may be independently connected to the bicycle (e.g., the remote tube may be connected to one of the wheel members such as upper arm member 103 in FIG. 1). FIG. 8 and FIG. 10 illustrate such a construction, wherein the primary tube 302 is coupled to upper arm member 103 and the remote tube 304 is connected to the upper arm member 103 by a connector. Regardless of how the remote tube 304 is situated in relation to the primary tube 302, however, the underlying principles of the present invention will remain the same.

A piston 308 on the lower end of a piston rod 310 divides the inside of the primary tube 302 into and upper fluid chamber 312 and a lower fluid chamber 314 which are both filled with a viscous fluid such as oil. The piston rod 310 is sealed through the cap with oil seals 316 and an upper mount 318 connects the piston to the chassis or sprung weight of the bicycle (e.g., to the seat tube). A lower mount 342 connects the primary tube 302 to the rear wheel of the bicycle via one or more wheel members (e.g., upper arm members 103 in FIG. 1 or lever 205 of FIG. 2). Longitudinally extending passages 320 in the piston 308 provide for limited fluid communication between the upper fluid chamber 312 and lower fluid chamber 314.

An inertial valve 322 which is slightly biased by a lightweight spring 324 moves within a chamber 326 of the remote tube 304. The lightweight spring 324 is illustrated in a fully extended state and, as such, the inertial valve 322 is illustrated at one endmost position within its full range of motion. In this position, fluid flow from the primary tube 302 to the remote tube 304 via the connector hose 306 is blocked or reduced. By contrast, when the lightweight spring 324 is in a fully compressed state, the inertial valve resides beneath the interface between the remote tube 304 and the connector hose 306. Accordingly, in this position, fluid flow from the primary tube 302 to the remote tube 304 through the connector hose 306 is enabled. In one embodiment, the inertial valve 322 is composed of a dense, heavy metal such as brass.

Disposed within the body of the inertial valve 322 is a fluid return chamber 336, a first fluid return port 337 which couples the return chamber 336 to the connector hose 306, and a second fluid return port 339 which couples the return chamber 336 to remote fluid chamber 332. A fluid return element 338 located within the fluid return chamber 336 is biased by another lightweight spring 340 (hereinafter referred to as a "fluid return spring"). In FIG. 3 the fluid return spring 340 is illustrated in its fully extended position. In this position, the fluid return element 338 separates (i.e., decouples) the fluid return chamber 336 from the fluid return port 337. By contrast, when the fluid return spring 340 is in its fully compressed position, the fluid return element 338 no longer separates the fluid return chamber 336 from the fluid return port 337. Thus, in this position, fluid flow from the fluid return chamber 336 to the connector hose 306 is enabled. The operation of the inertial valve 322 and the fluid return mechanism will be described in detail below.

The remaining portion of the remote tube 304 includes a floating piston 328 which separates a gas chamber 330 and a fluid chamber 332. In one embodiment of the present invention, the gas chamber 330 is pressurized with Nitrogen (e.g., at 150 p.s.i.) and the fluid chamber 332 is filled with oil. An air valve 334 at one end of the remote tube 322 allows for the gas chamber 330 pressure to be increased or decreased as required.

The operation of the damping enhancement system will be described first with respect to downward forces produced by the movement of the rider (and the mass of the bicycle frame) and then with respect to forces produced by the impact between the wheel and the terrain.

1. Forces Produced by the Rider

Figure 4:
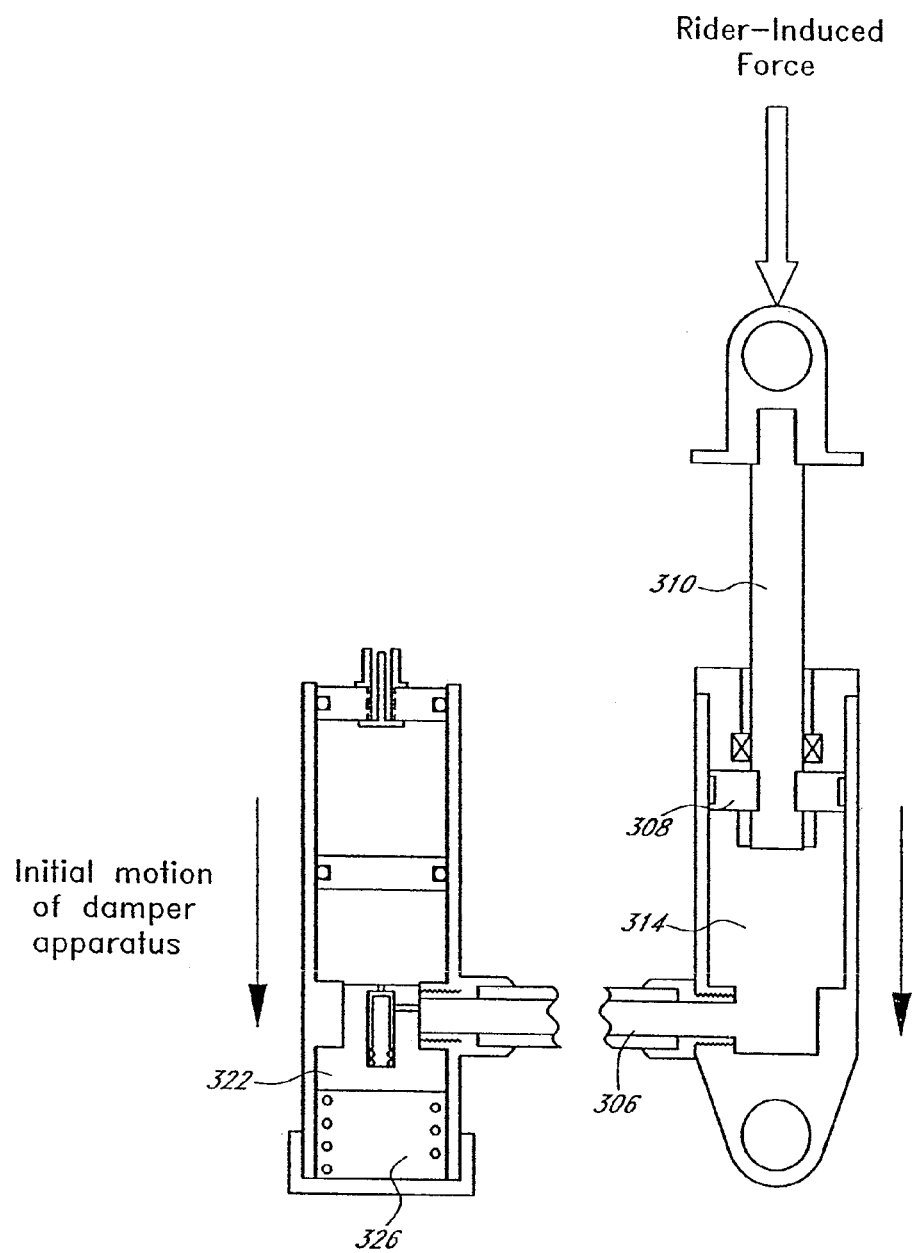
FIG. 4 illustrates an embodiment of the present invention reacting to a rider-induced force.

A rider-induced force is illustrated in FIG. 4, forcing the piston arm 310 in the direction of the lower fluid chamber 314. In order for the piston 308 to move into fluid chamber 314 in response to this force, fluid (e.g., oil) contained within the fluid chamber 314 must be displaced. This is due to the fact that fluids such as oil are not compressible. If lightweight spring 324 is in a fully extended state as shown in FIG. 4, the inertial valve 322 will be "closed" (i.e., will block or reduce the flow of fluid from lower fluid chamber 314 through the connector hose 306 into the remote fluid chamber 332). Although the entire apparatus will tend to move in a downward direction in response to the rider-induced force, the inertial valve 322 will remain in the nested position shown in FIG. 4 (i.e., it is situated as far towards the top of chamber 326 as possible). Accordingly, because the fluid in fluid chamber 314 has no where to flow in response to the force, the piston 308 will not move down into fluid chamber 314 to any significant extent. As a result, a "stiff" damping rate will be produced in response to rider-induced forces (i.e., forces originating through piston rod 310).

2. Forces Produced by the Terrain

Figure 5:
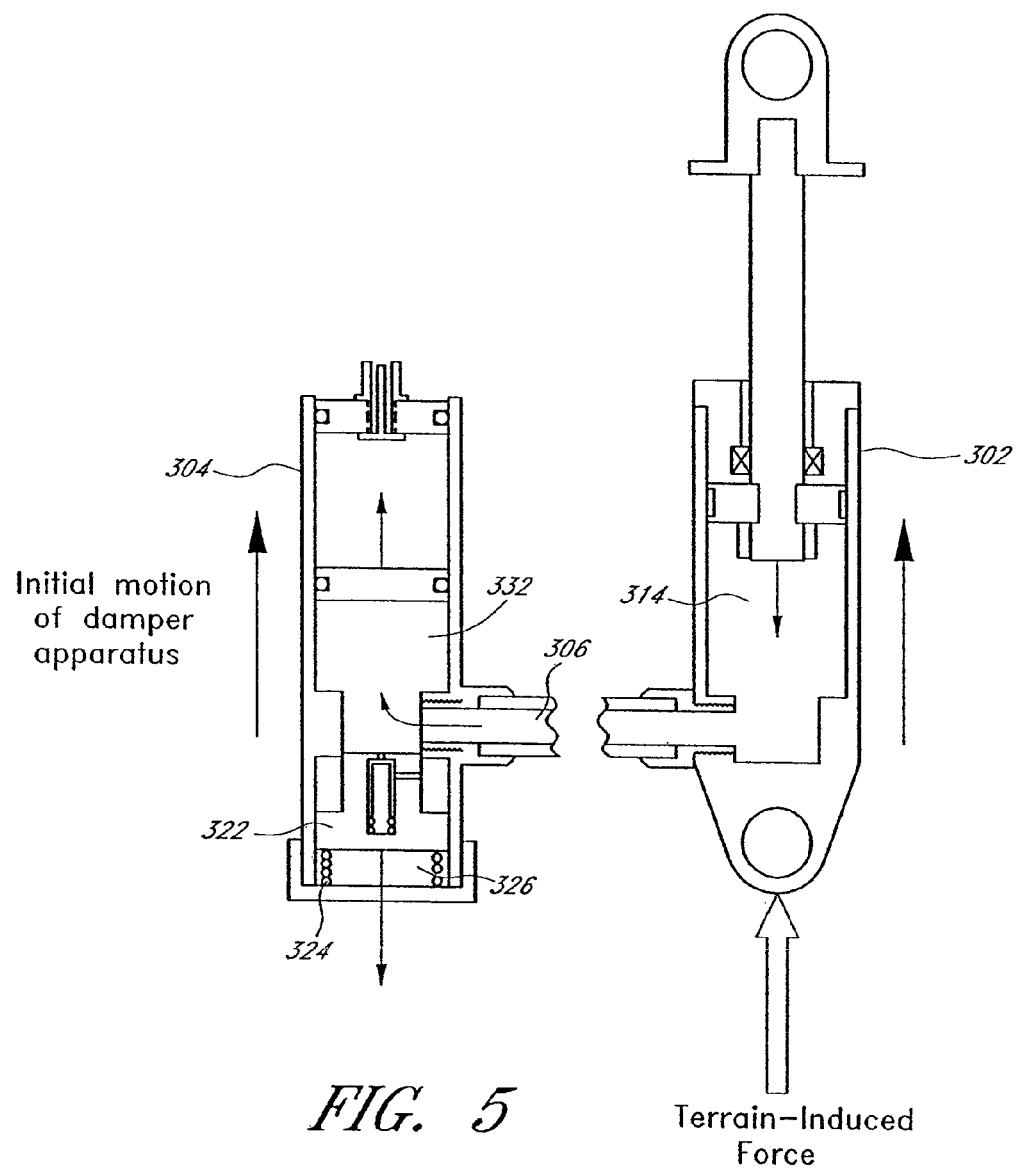
FIG. 5 illustrates an embodiment of the present invention reacting to a terrain-induced force.

As illustrated in FIG. 5, the damping enhancement system will respond in a different manner to forces originating from the terrain and transmitted through the bicycle wheel (hereinafter "terrain-induced forces"). In response to this type of force, the inertial valve 322 will move downward into chamber 326 as illustrated and will thereby allow fluid to flow from lower chamber 314 into remote chamber 332 via connector hose 306. The reason for this is that the entire apparatus will initially move in the direction of the terrain-induced force while the inertial valve 322 will tend to remain stationary because it is comprised of a dense, heavy material (e.g., such as brass). Thus, the primary tube 302 and the remote tube 304 will both move in a generally upward direction and, relative to this motion, the inertial valve 322 will move downward into chamber 326 and compress the lightweight spring 324. As illustrated in FIG. 5 this is the inertial valve's "open" position because it couples lower fluid chamber 314 to remote fluid chamber 332 (via connector hose 306).

Once the interface between connector hose 306 and remote fluid chamber 332 is unobstructed, fluid from lower fluid chamber 314 will flow across connector hose 306 into remote fluid chamber 332 in response to the downward force of piston 308 (i.e., the fluid can now be displaced). As remote fluid chamber 314 accepts additional fluid as described, floating piston 328 will move towards gas chamber 330 (in an upward direction in FIG. 5), thereby compressing the gas in gas chamber 330. The end result, will be a "softer" damping rate in response to terrain-induced forces (i.e., forces originating from the wheels of the bicycle).

Once the inertial valve moves into an "open" position as described above, it will eventually need to move back into a "closed" position so that a stiff damping rate can once again be available for rider-induced forces. Thus, lightweight spring 324 will tend to move the inertial valve 322 back into its closed position. In addition, the return spring surrounding primary tube 302 (not shown) will pull piston rod 310 and piston 308 in an upward direction out of lower fluid chamber 314. In response to the motion of piston 308 and to the compressed gas in gas chamber 330, fluid will tend to flow from remote fluid chamber 332 back to lower fluid chamber 314 (across connector hose 306).

Figure 6:
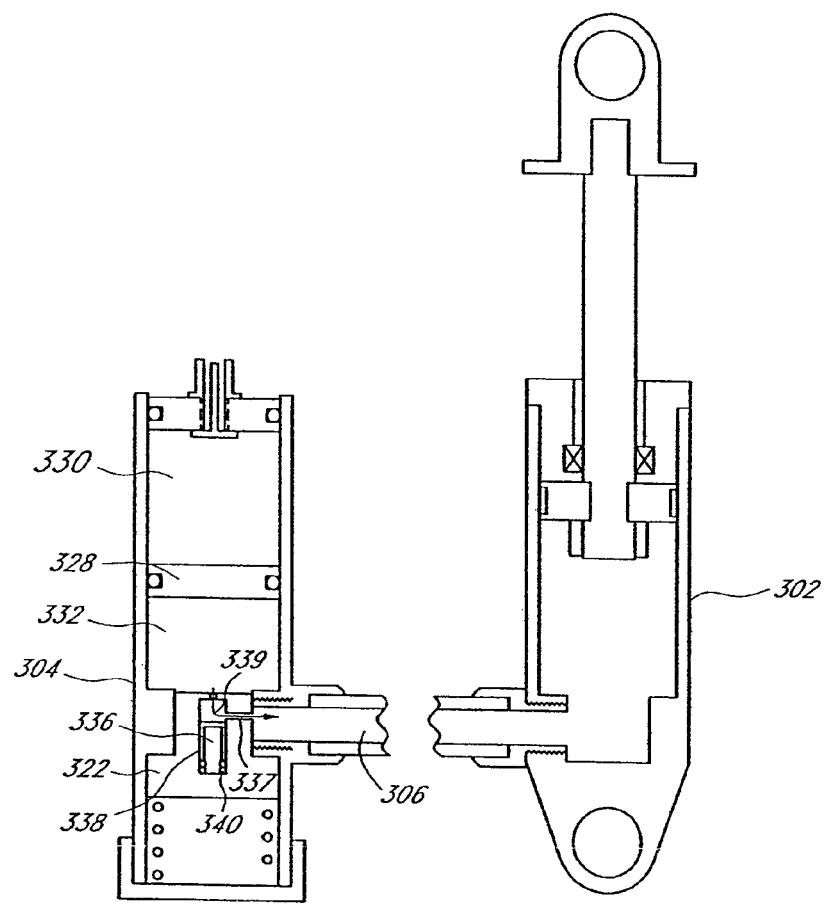
FIG. 6 illustrates the fluid refill mechanism of an embodiment of the present invention.

To allow fluid to flow in this direction even when inertial valve 322 is in a closed position, inertial valve 322 (as described above) includes the fluid return elements described above. Thus, as illustrated in FIG. 6, in response to pressurized gas in gas chamber 330, fluid in remote fluid chamber 332 will force fluid return element 338 downward into fluid return chamber 336 (against the force of the fluid return spring 340). Once fluid return element 338 has been forced down below fluid return port 337, fluid will flow from remote fluid chamber 332 through fluid return port 339, fluid return chamber 336, fluid return port 337, connector hose 306, and finally back into lower fluid chamber 314. This will occur until the pressure in remote fluid chamber 336 is low enough so that fluid return element 338 can be moved back into a "closed" position (i.e., when the force of fluid return spring 340 is greater than the force created by the fluid pressure).

The sensitivity of inertial valve 322 may be adjusted by changing the angle with which it is positioned in relation to the terrain-induced force. For example, in FIG. 5, the inertial valve 322 is positioned such that its movement in chamber 326 is parallel (and in the opposite direction from) to the terrain-induced force. This positioning produces the greatest sensitivity from the inertial valve 322 because the entire terrain-induced force vector is applied to the damper enhancement system in the exact opposite direction of the inertial valve's 322 line of movement.

By contrast, if the remote tube containing the inertial valve 322 were positioned at, for example, a 45 degree angle from the position shown in FIG. 5 the inertial valve's 322 sensitivity would be decreased by approximately one half because only one half of the terrain-induced force vector would be acting to move the damper enhancement system in the opposite direction of the valve's line of motion. Thus, twice the terrain-induced force would be required to trigger the same response from the inertial valve 322 in this angled configuration. FIGS. 8-11 illustrate the remote tube 304 positioned at an angle from the primary tube 302 (shown in phantom). With such a construction, the sensitivity of the inertial value 322 may be adjusted as described immediately above.

Thus, in one embodiment of the damper enhancement system the angle of the remote tube 304 in which the inertial valve 322 resides is manually adjustable to change the inertial valve 322 sensitivity. This embodiment may further include a sensitivity knob or dial for adjusting the angle of the remote tube 304. The sensitivity knob may have a range of different sensitivity levels disposed thereon for indicating the particular level of sensitivity to which the damper apparatus is set. In one embodiment the sensitivity knob may be rotatably coupled to the bicycle frame separately from the remote tube, and may be cooperatively mated with the remote tube (e.g., with a set of gears). Numerous different configurations of the sensitivity knob and the remote tube 304 are possible within the scope of the underlying invention. The connector hose 306 of this embodiment is made from a flexible material such that the remote tube 304 can be adjusted while the primary tube remains in a static position.

Figure 7:
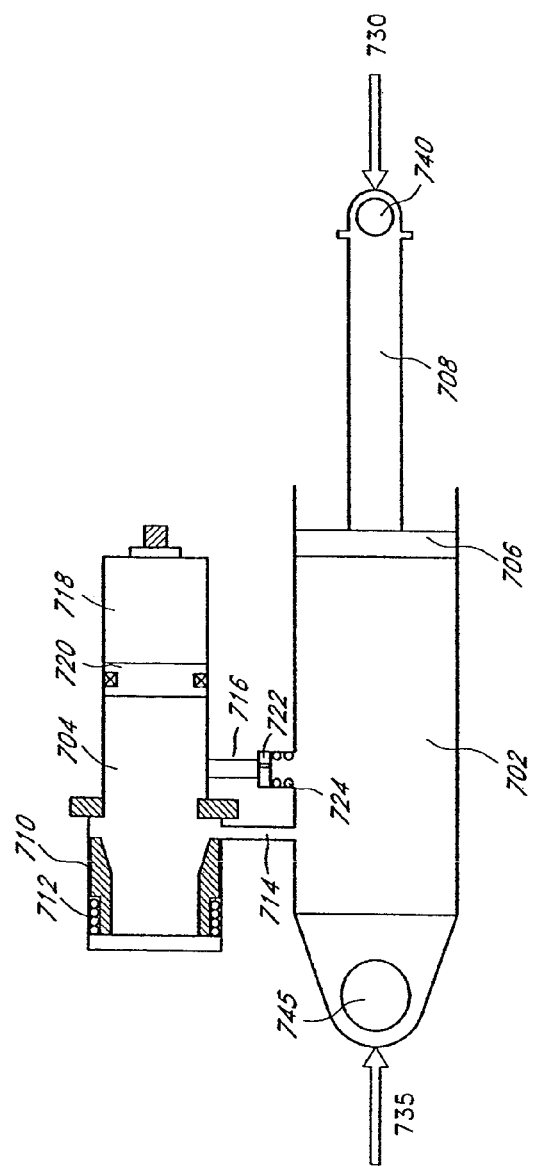
FIG. 7 illustrates another embodiment of the present invention.

Another embodiment of the damper enhancement system is illustrated in FIG. 7. Like the previous embodiment, this embodiment includes a primary fluid chamber 702 and a remote fluid chamber 704. A piston 706 coupled to a piston shaft 708 moves within the primary fluid chamber 702. The primary fluid chamber 702 is coupled to the remote fluid chamber via an inlet port 714 (which transmits fluid from the primary fluid chamber 702 to the remote fluid chamber 704) and a separate refill port 716 (which transmits fluid from the remote fluid chamber 704 to the primary fluid chamber 702).

An inertial valve 710 biased by a lightweight spring 712 resides in the remote fluid chamber 704. A floating piston 720 separates the remote fluid chamber from a gas chamber 718. In response to terrain-induced forces (represented by force vector 735), the inertial valve, due to its mass, will compress the lightweight spring 712 and allow fluid to flow from primary fluid chamber 702 to remote fluid chamber 704 over inlet port 714. This will cause floating piston 720 to compress gas within gas chamber 718.

After inertial valve 710 has been repositioned to it's "closed" position by lightweight spring 712, fluid in remote fluid chamber 704 will force fluid refill element 722 open (i.e., will cause fluid refill spring 724 to compress). Thus, fluid will be transmitted from remote fluid chamber 704 to primary fluid chamber 702 across refill port 716 until the pressure of the fluid in remote fluid chamber is no longer enough to keep fluid refill element 722 open. Thus, the primary difference between this embodiment and the previous embodiment is that this embodiment employs a separate refill port 716 rather than configuring a refill port within the inertial valve itself.

What is claimed is:

1. A bicycle, comprising:
   a bicycle frame;
   a wheel having an outer circumferential surface for contacting a terrain surface; and
   a damping system for damping movement of the wheel relative to the bicycle frame, the damping system comprising:
   a damper tube; and
   an inertia valve assembly, the inertia valve assembly comprising an inertia mass positionable in open and closed positions, wherein in the closed position a flow of damping fluid from the damper tube is more restricted than in the open position, and
   wherein at least a portion of the inertia valve assembly is disposed adjacent the wheel and closer to a rotational axis of the wheel than the outer circumferential surface of the wheel and the inertia valve assembly is fluidly coupled to the damper tube by a hose.

2. The bicycle of claim 1, wherein the inertia valve assembly is not in direct contact with the damper tube.

3. The bicycle of claim 1, wherein the inertia valve assembly is positioned rearward of the damper tube.

4. The bicycle of claim 1, wherein the inertia valve assembly is coupled to a wheel member of the bicycle.

5. The bicycle of claim 4, wherein the wheel member comprises an upper arm member.

6. The bicycle of claim 1, wherein the damping system comprises a soft damping rate when, the inertia mass is in the open position and a stiff damping rate when the inertia mass is in the closed position.

7. The bicycle of claim 1, wherein any significant translational motion of wheel relative to the bicycle frame is prevented when the inertia mass is in the closed position.

8. The bicycle of claim 1, wherein the inertia valve assembly comprises a refill port that permits damping fluid to move from the inertia valve assembly to the damper tube.

9. The bicycle of claim 8, wherein the refill port permits damping fluid to pass through an opening of the inertia mass.

10. A bicycle, comprising:
    a bicycle frame;
    a wheel having an outer circumferential surface for contacting a terrain surface; and
    a damping system for damping movement of the wheel relative to the bicycle frame, the damping system comprising:
    a damper tube; and
    an inertia valve assembly, the inertia valve assembly comprising an inertia mass positionable in open and closed positions, wherein in the closed position a flow of damping fluid from the damper tube is more restricted than in the open position, and wherein the inertia valve assembly is coupled to a wheel member of the bicycle such that the inertia valve assembly is exterior to the damper tube.

11. The bicycle of claim 10, wherein the inertia valve assembly is not in direct contact with the damper tube.

12. The bicycle of claim 10, wherein the inertia valve assembly is positioned rearward of the damper tube.

13. The bicycle of claim 10, wherein the inertia valve assembly is fluidly coupled to the damper tube by a hose.

14. The bicycle of claim 10, wherein the wheel member comprises an upper arm member.

15. The bicycle of claim 10, wherein at least a portion of the inertia valve assembly is disposed adjacent the wheel and closer to a rotational axis of the wheel than the outer circumferential surface of the wheel.

16. The bicycle of claim 10, wherein the damping system comprises a soft damping rate when the inertia mass is in the open position and a stiff damping rate when the inertia mass is in the closed position.

17. The bicycle of claim 10, wherein any significant translational motion of wheel relative to the bicycle frame is prevented when the inertia mass is in the closed position.

18. The bicycle of claim 10, wherein the inertia valve assembly comprises a refill port that permits damping fluid to move from the inertia valve assembly to the damper tube.

19. The bicycle of claim 18, wherein the refill port permits damping fluid to pass through an opening of the inertia mass.

* * * * *